(12) United States Patent
Sloane et al.

(10) Patent No.: US 11,934,532 B2
(45) Date of Patent: Mar. 19, 2024

(54) SYSTEM FOR QUANTIFICATION OF CYBERSECURITY MODULE EFFICACY USING Q-MATRIX BASED CORRELATION ANALYSIS

(71) Applicant: BANK OF AMERICA CORPORATION, Charlotte, NC (US)

(72) Inventors: Brandon Sloane, Indian Land, SC (US); Jacob B. Dirr, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 362 days.

(21) Appl. No.: 17/342,870

(22) Filed: Jun. 9, 2021

(65) Prior Publication Data

US 2022/0398323 A1 Dec. 15, 2022

(51) Int. Cl.
*G06F 21/57* (2013.01)
*G06F 17/16* (2006.01)
*G06F 17/18* (2006.01)

(52) U.S. Cl.
CPC ............ *G06F 21/577* (2013.01); *G06F 17/16* (2013.01); *G06F 17/18* (2013.01); *G06F 2221/034* (2013.01)

(58) Field of Classification Search
CPC ........ G06F 21/577; G06F 17/16; G06F 17/18; G06F 2221/034
See application file for complete search history.

(56) References Cited

U.S. PATENT DOCUMENTS

| | | |
|---|---|---|
| 8,533,028 B2 | 9/2013 | Mackenzie |
| 8,799,668 B2 | 8/2014 | Cheng |
| 8,881,288 B1 | 11/2014 | Levy et al. |
| 8,904,181 B1 | 12/2014 | Felsher et al. |
| 9,548,860 B2 | 1/2017 | Zhang et al. |
| 9,870,455 B2 | 1/2018 | Song et al. |
| 10,185,832 B2 | 1/2019 | Cam |
| 10,187,401 B2 | 1/2019 | Machlica et al. |
| 10,187,409 B1 | 1/2019 | Averbuch et al. |
| 10,193,861 B2 | 1/2019 | Smith |

(Continued)

OTHER PUBLICATIONS

Mechtri L, Tolba FD, Ghoualmi N. Intrusion detection using principal component analysis. In2010 Second International Conference on Engineering System Management and Applications Mar. 30, 2010 (pp. 1-6). IEEE. (Year: 2010).*

*Primary Examiner* — James R Turchen
(74) *Attorney, Agent, or Firm* — Moore & Van Allen PLLC; Seongun M. Hong

(57) ABSTRACT

A system is provided for quantification of cybersecurity module efficacy using Q-matrix based correlation analysis. In particular, the system may use Q-matrices to calculate adaptive correlation scores between cybersecurity module and expected and/or desired outcomes across one or more different dimensions. A first axis of the Q-matrix for a particular cybersecurity module may be populated with one or more key elements of the cybersecurity module, while a second axis of the Q-matrix may comprise the outputs or metrics that may be used to quantify the efficacy of the cybersecurity module with respect to the key elements as represented on the first axis. The correlation scores may then be used as inputs into a decisioning engine that may be used to drive entity-wide decisioning processes based on the outputs of the Q-matrix based analysis.

20 Claims, 3 Drawing Sheets

(56) References Cited

U.S. PATENT DOCUMENTS

| | | | |
|---|---|---|---|
| 10,210,518 B2 | 2/2019 | Alnajem | |
| 10,417,415 B2 * | 9/2019 | Abbaszadeh | G06N 20/00 |
| 10,546,135 B1 | 1/2020 | Kassoumeh et al. | |
| 10,572,640 B2 | 2/2020 | Yan et al. | |
| 10,810,210 B2 | 10/2020 | Choudhury et al. | |
| 11,748,488 B2 * | 9/2023 | Helfman | G06F 21/577 |
| | | | 726/25 |
| 2013/0298244 A1 * | 11/2013 | Kumar | G06F 21/51 |
| | | | 726/25 |
| 2016/0012235 A1 | 1/2016 | Lee et al. | |
| 2016/0021141 A1 | 1/2016 | Liu et al. | |
| 2017/0104780 A1 * | 4/2017 | Zaffarano | H04L 63/20 |
| 2017/0331851 A1 * | 11/2017 | Pinney Wood | G06F 21/577 |
| 2018/0103052 A1 | 4/2018 | Choudhury et al. | |
| 2018/0176243 A1 | 6/2018 | Arnaldo et al. | |
| 2018/0285740 A1 | 10/2018 | Smyth et al. | |
| 2019/0260804 A1 * | 8/2019 | Beck | G06F 16/2455 |
| 2020/0034701 A1 | 1/2020 | Ritter et al. | |
| 2020/0356678 A1 * | 11/2020 | Gourisetti | G06F 21/577 |
| 2020/0358792 A1 * | 11/2020 | Bazalgette | G06N 20/00 |
| 2021/0126936 A1 * | 4/2021 | Gerber, Jr. | H04L 63/20 |
| 2022/0060499 A1 * | 2/2022 | Huda | H04L 63/1416 |
| 2022/0156372 A1 * | 5/2022 | Harang | G06F 21/56 |
| 2022/0224712 A1 * | 7/2022 | Huda | H04L 63/1483 |
| 2022/0294818 A1 * | 9/2022 | Parekh | G06F 21/602 |
| 2022/0345479 A1 * | 10/2022 | Markonis | H04L 63/1433 |
| 2022/0366332 A1 * | 11/2022 | Duessel | G06Q 40/06 |
| 2022/0385687 A1 * | 12/2022 | McKinley | H04L 63/1441 |
| 2022/0405398 A1 * | 12/2022 | Koelemij | G06F 21/552 |
| 2023/0004655 A1 * | 1/2023 | Poulin | G06F 21/577 |

\* cited by examiner

| | Unauthorized attempts identified | Intrusions detected within threshold timeframe | Intrusions successfully prevented | Incidents successfully resolved |
|---|---|---|---|---|
| Recognition of unauthorized access attempts (0.8) | 0.7 | 0.3 | 0.8 | 0.4 |
| Network intrusion detection methods (0.5) | 0.3 | 0.8 | 0.6 | 0.4 |
| Software countermeasures (0.3) | 0.6 | 0.5 | 0.7 | 0.7 |
| Resolution steps (0.4) | 0.2 | 0.3 | 0.2 | 0.7 |
| Incident reporting and handling (0.6) | 0.1 | 0.2 | 0.2 | 0.3 |

FIRST AXIS 201

SECOND AXIS 202

FIG. 2

SYSTEM FOR QUANTIFICATION OF CYBERSECURITY MODULE EFFICACY USING Q-MATRIX BASED CORRELATION ANALYSIS

FIELD OF THE INVENTION

The present disclosure embraces a system for quantification of cybersecurity module efficacy using Q-matrix based correlation analysis.

BACKGROUND

There is a need for an effective way to quantify the efficacy of cybersecurity modules.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for quantification of cybersecurity module efficacy using Q-matrix based correlation analysis. In particular, the system may use Q-matrices to calculate adaptive correlation scores between cybersecurity module and expected and/or desired outcomes across one or more different dimensions. A first axis of the Q-matrix for a particular cybersecurity module may be populated with one or more key elements of the cybersecurity module, while a second axis of the Q-matrix may comprise the outputs or metrics that may be used to quantify the efficacy of the cybersecurity module with respect to the key elements as represented on the first axis. The correlation scores may then be used as inputs into a decisioning engine that may be used to drive entity-wide decisioning processes based on the outputs of the Q-matrix based analysis.

Accordingly, embodiments of the present disclosure provide a system for quantification of cybersecurity module efficacy using Q-matrix based correlation analysis, the system comprising a memory device with computer-readable program code stored thereon; a communication device; and a processing device operatively coupled to the memory device and the communication device, wherein the processing device is configured to execute the computer-readable program code to identify a cybersecurity module for assessment; generate a Q-matrix for assessing the cybersecurity module, the Q-matrix comprising one or more characteristics of the cybersecurity module along a first axis and one or more assessment metrics along a second axis; populate the Q-matrix by computing correlation values between each of the one or more characteristics and each of the one or more assessment metrics; based on the correlation values, identify a set of characteristics from the one or more characteristics for prioritization; and implement one or more remediation steps on the set of characteristics for prioritization.

In some embodiments, the correlation values are computed through a dynamic computation process comprising detecting a change in the one or more assessment metrics; and automatically updating the correlation values based on the change in the one or more assessment metrics.

In some embodiments, the set of characteristics for prioritization comprises detecting, from the correlation values, a set of correlation values that fall below a system-defined threshold; and selecting the set of characteristics based on detecting the set of correlation values that fall below the system-defined threshold.

In some embodiments, each of the characteristics comprises a priority value, wherein identifying the set of characteristics for prioritization further comprises ordering each of the set of characteristics according to the priority value.

In some embodiments, the correlation values are numerical values.

In some embodiments, the correlation values are ranges of numerical values.

In some embodiments, the correlation values are represented as distribution curves.

Embodiments of the present disclosure also provide a computer program product for quantification of cybersecurity module efficacy using Q-matrix based correlation analysis, the computer program product comprising at least one non-transitory computer readable medium having computer-readable program code portions embodied therein, the computer-readable program code portions comprising executable code portions for identifying a cybersecurity module for assessment; generating a Q-matrix for assessing the cybersecurity module, the Q-matrix comprising one or more characteristics of the cybersecurity module along a first axis and one or more assessment metrics along a second axis; populating the Q-matrix by computing correlation values between each of the one or more characteristics and each of the one or more assessment metrics; based on the correlation values, identifying a set of characteristics from the one or more characteristics for prioritization; and implementing one or more remediation steps on the set of characteristics for prioritization.

In some embodiments, the correlation values are computed through a dynamic computation process comprising detecting a change in the one or more assessment metrics; and automatically updating the correlation values based on the change in the one or more assessment metrics.

In some embodiments, identifying the set of characteristics for prioritization comprises detecting, from the correlation values, a set of correlation values that fall below a system-defined threshold; and selecting the set of characteristics based on detecting the set of correlation values that fall below the system-defined threshold.

In some embodiments, each of the characteristics comprises a priority value, wherein identifying the set of characteristics for prioritization further comprises ordering each of the set of characteristics according to the priority value.

In some embodiments, the correlation values are numerical values.

In some embodiments, the correlation values are ranges of numerical values.

Embodiments of the present disclosure also provide a computer-implemented method for quantification of cybersecurity module efficacy using Q-matrix based correlation analysis, wherein the computer-implemented method comprises identifying a cybersecurity module for assessment; generating a Q-matrix for assessing the cybersecurity module, the Q-matrix comprising one or more characteristics of the cybersecurity module along a first axis and one or more assessment metrics along a second axis; populating the Q-matrix by computing correlation values between each of the one or more characteristics and each of the one or more assessment metrics; based on the correlation values, identifying a set of characteristics from the one or more characteristics for prioritization; and implementing one or more remediation steps on the set of characteristics for prioritization.

In some embodiments, the correlation values are computed through a dynamic computation process comprising detecting a change in the one or more assessment metrics; and automatically updating the correlation values based on the change in the one or more assessment metrics.

In some embodiments, identifying the set of characteristics for prioritization comprises detecting, from the correlation values, a set of correlation values that fall below a system-defined threshold; and selecting the set of characteristics based on detecting the set of correlation values that fall below the system-defined threshold.

In some embodiments, each of the characteristics comprises a priority value, wherein identifying the set of characteristics for prioritization further comprises ordering each of the set of characteristics according to the priority value.

In some embodiments, the correlation values are numerical values.

In some embodiments, the correlation values are ranges of numerical values.

In some embodiments, the correlation values are represented as distribution curves.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
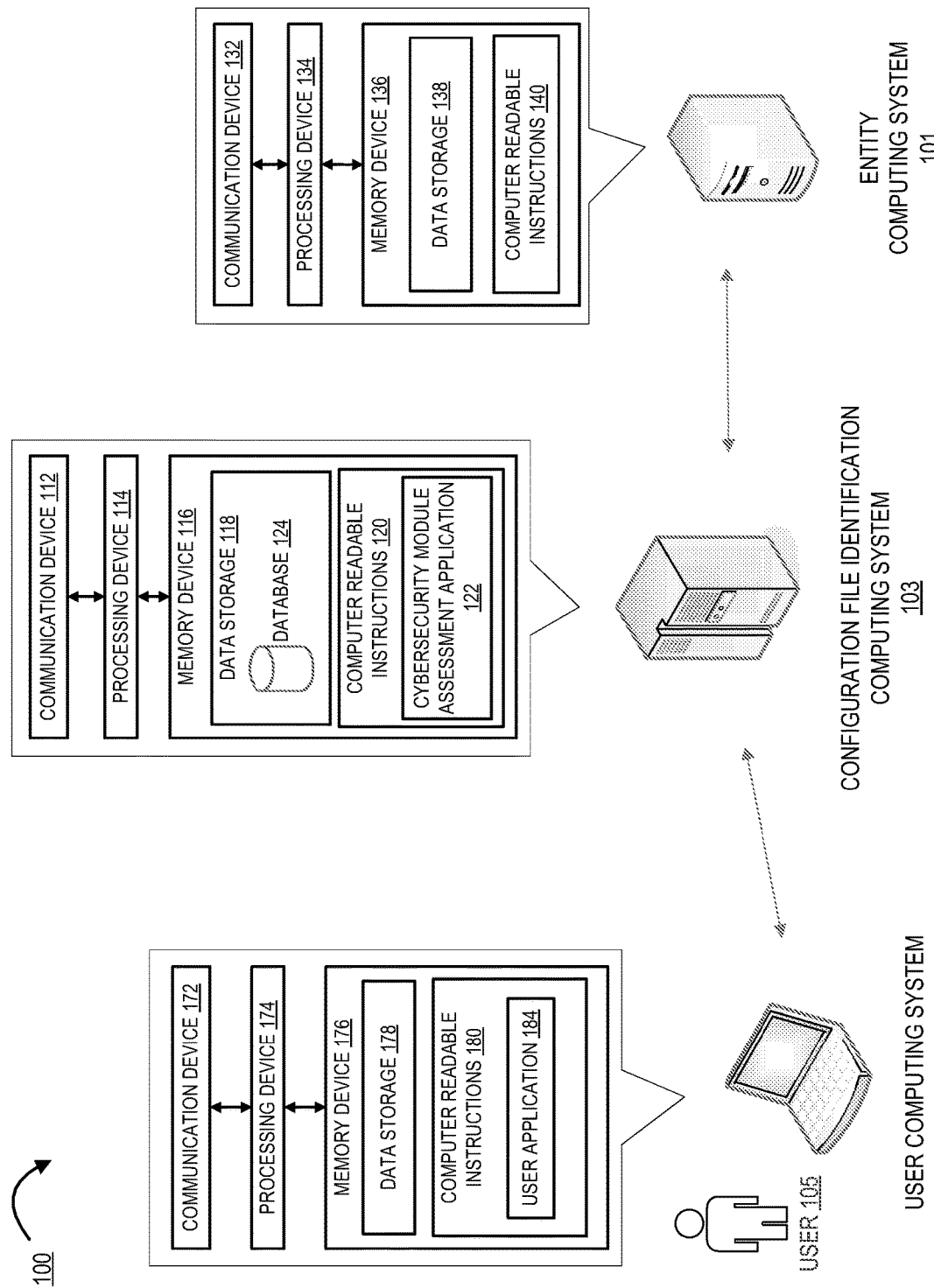
Figure 3:
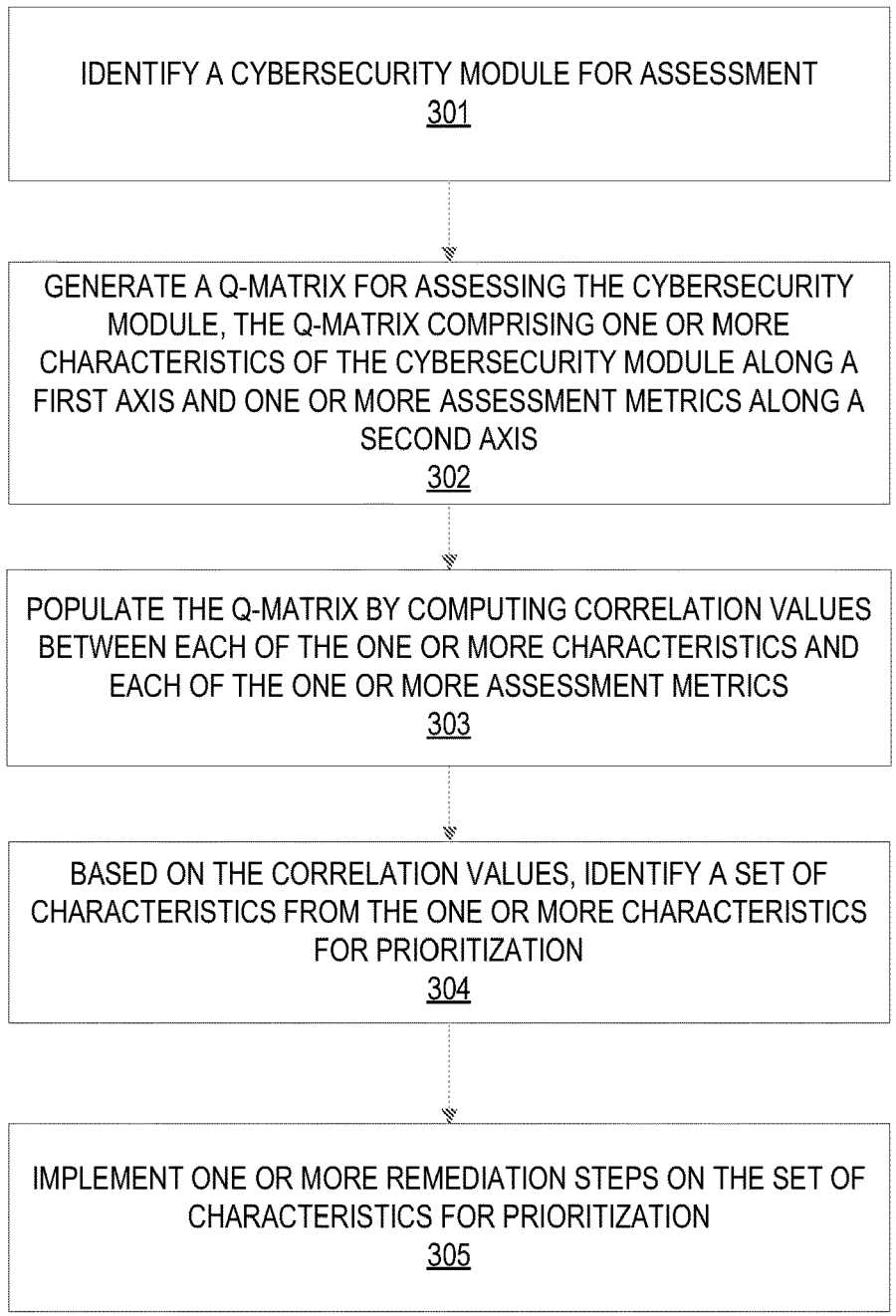

Having thus described embodiments of the invention in general terms, reference will now be made to the accompanying drawings, wherein:

FIG. 1 illustrates an operating environment for the cybersecurity module assessment system, in accordance with one embodiment of the present disclosure;

FIG. 2 illustrates an exemplary Q-matrix for a cybersecurity module, in accordance with one embodiment of the present disclosure; and FIG. 3 illustrates a process flow for quantification of cybersecurity module efficacy using Q-matrix based correlation analysis, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Q-matrix" as used herein may refer to a rectangular array having the general form x×y, where x represents a number of items along a first axis (e.g., the number of rows) and y represents a number of items along a second axis (e.g., the number of columns), where the Q-matrix may be used to evaluate one or more characteristics of an input on the first axis (e.g., a cybersecurity module) with respect to one or more outputs on the second axis (e.g., outcomes or results from the cybersecurity module).

"Cybersecurity module" as used herein may refer to a measure that may be taken by an entity with respect to securing and protecting computing systems, data, hardware, software, applications, or other types of computing resources. Accordingly, in some embodiments a cybersecurity module may refer to a training resource (e.g., informational materials such as bulletin or presentation, an interactive class or session, or the like), though it is within the scope of the disclosure for the cybersecurity module to be a hardware and/or software-based cybersecurity solution that may be implemented (e.g., anti-malware software, firewall and/or network segmentation settings, or the like).

Embodiments of the present disclosure provide a system as described herein provides a system for quantification of cybersecurity module efficacy using Q-matrix based correlation analysis. In particular, the system may allow a cybersecurity module, as well as the effects or outcomes from using such a cybersecurity module, to be analyzed on a multidimensional level along one or more dimensions or characteristics. In this regard, a Q-matrix may be used wherein a first axis of the Q-matrix may be populated with the characteristics of a particular cybersecurity module (e.g., core concepts of a training module), while a second axis of the Q-matrix may be populated with one or more metrics associated with the potential outcomes or results of implementing the cybersecurity module. In some embodiments, each core concept may be associated with a priority value depending on the importance of the core concept to the entity; the more critical concepts or areas that carry a greater probability of adverse effects (e.g., practices that affect the safety of critical data) may be assigned relatively higher priority values.

Based on the core concepts as enumerated along the first axis and the metrics as enumerated along the second axis, each cell within Q-matrix may be populated with correlation values (e.g., a numerical value ranging from 0 to 1), where each correlation value represents the degree of correlation or relationship between a particular characteristic or dimension of the cybersecurity module and a particular metric or outcome. In other words, the correlation values may represent the effectiveness of core concepts of a training module along various metrics. In some embodiments, the correlation values may change dynamically on a real-time or near real-time basis as the underlying values for the metrics may change over time. For example, a cybersecurity module may be evaluated for its effectiveness in reducing the incidence of malware intrusion via e-mail links. In such a scenario, one metric may be the number of instances in which malware was introduced into the entity's network through an e-mail link. Over time, this number may fluctuate (e.g., decrease over time after the implementation of the cybersecurity module). Accordingly, a decrease in the number of instances may result in a higher correlation value to reflect a higher effectiveness of the cybersecurity module with respect to the exemplary relationship.

The system as described herein confers a number of technological advantages over conventional module assessment systems. In particular, by using Q-matrices, the system may provide a data-driven process for evaluating the performance of cybersecurity modules. Furthermore, by constantly recalculating correlation values over time, the system may provide an up-to-date portrait of an entity's cybersecurity posture, which in turn provides an efficient and effective way to drive decisioning processes with respect to enhancing cybersecurity within the entity's network.

Turning now to the figures, FIG. 1 illustrates an operating environment 100 for the cybersecurity module assessment system, in accordance with one embodiment of the present disclosure. In particular, FIG. 1 illustrates a cybersecurity module assessment computing system 103 that is operatively coupled, via a network, to an entity computing system 101 and/or a user computing system 104. In such a configuration, the cybersecurity module assessment computing system 103 may transmit information to and/or receive information from the entity computing system 101 and/or the user computing system 104.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts the entity computing system 101 and user computing system 104 as singular computing systems, some embodiments may include a greater number of entity computing systems and user computing systems within the network environment. It should also be understood that one or more functions of the systems, devices, or servers as depicted in FIG. 1 may be combined into a single system, device, or server. For instance, in some embodiments, the functions of the entity computing system 101 may be performed by the cybersecurity module assessment computing system 103, or conversely, the functions of the cybersecurity module assessment computing system 103 may be performed by the entity computing system 101. Furthermore, a single system, device, or server as depicted in FIG. 1 may represent multiple systems, devices, or servers. For instance, though the cybersecurity module assessment computing system 103 is depicted as a single unit, the functions of the cybersecurity module assessment computing system 103 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the cybersecurity module assessment computing system 103 may be a networked server, desktop computer, laptop computer, routing device, or other type of computing system within the network environment which performs the module assessment processes as described herein. Accordingly, the cybersecurity module assessment computing system 103 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the entity computing system 101 and/or the user computing system 104. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may be used to store information needed to perform the processes of the cybersecurity module assessment computing system 103. For instance, the database 124 may comprise historical data (e.g., past computations of correlation values, Q-matrices used in the past, module outcome data, or the like).

The memory device 116 may further have computer-readable instructions 120 stored thereon, where the computer-readable instructions 120 may comprise a cybersecurity module assessment application 122, which may comprise computer-executable program code which may instruct the processing device 114 to perform certain logic, data processing, and data storing functions of the application to accomplish the entity's objectives. For instance, the cybersecurity module assessment application 122 may generate Q-matrices with respect to cybersecurity modules, calculate and/or update correlation values, calculating priority values, or the like.

As further illustrated in FIG. 1, the operating environment 100 may further comprise an entity computing system 101 in operative communication with the cybersecurity module assessment computing system 103. In particular, the entity computing system 101 may be a computing system identified within the network environment that may contain data that is tracked and/or used by the cybersecurity module assessment 103 in performing its Q-matrix computations. In this regard, the entity computing system 101 may contain data records regarding various metrics associated with cybersecurity (e.g., data breach instances, security policy compliance metrics, or the like). Accordingly, the entity computing system 101 may be a computing system such as a server or networked terminal, though it is within the scope of the disclosure for the entity computing system 101 to be a device such as a desktop computer, laptop, IoT device, smartphone, tablet, single-board computer, or the like.

The entity computing system 101 may comprise a processing device 134 operatively coupled to a communication device 132 and a memory device 136 having data storage 138 and computer readable instructions 140 stored thereon. The data storage 138 may comprise the various types of data to be used by the c cybersecurity module assessment computing system 103 as described elsewhere herein.

In some embodiments, the operating environment 100 may further comprise a user computing system 104. The user computing system 104 may be a computing system that may be operated by a user 105, such as an administrator, agent, or employee of the entity. In some embodiments, the actions taken by the user 105 on the user computing system 104 may be tracked by the cybersecurity module assessment computing system 103 and/or the entity computing system 101. Accordingly, the user computing system 104 may be a computing system such as a desktop computer, laptop computer, smartphone or smart device, tablet, single board computer, or the like, though it is within the scope of the disclosure for the user computing system 104 to be any other kind of computing system as described herein. The user computing system 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 105.

The user computing system 104 may comprise a processing device 174 operatively coupled to a communication device 172 and a memory device 176, the memory device 176 comprising data storage 178 and computer readable instructions 180. The computer readable instructions 180 may comprise a user application 184 that allows the user 105 to take certain actions within the entity network (e.g., accessing e-mails, downloading files, accessing databases, or the like). In this regard, the user application 184 may be monitored by the cybersecurity module assessment computing system 103, which may use the data collected from the user application 184 to generate Q-matrices and/or correlation values with respect to a cybersecurity module that may be relevant to the user application 184.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates an exemplary Q-matrix 200 for a cybersecurity module, in accordance with one embodiment of the present disclosure. It should be understood that the exemplary Q-matrix is provided for illustrative purposes only and is not intended to limit the scope of the disclosure to the subject matter disclosed with respect to FIG. 2. The Q-matrix 200 as shown in FIG. 2 may represent a Q-matrix for evaluating the effectiveness of a particular cybersecurity module (e.g., a training module designed to reduce the incidence of network intrusions through e-mail links). In this regard, the Q-matrix 200 may comprise a first axis 201, along which one or more characteristics 203 of the cybersecurity module may be enumerated. In some embodiments, the characteristics 203 may be core concept areas of the cybersecurity module to be evaluated, where each characteristic 203 may further comprise a priority value (e.g., a numerical value ranging from 0 to 1) which may indicate the level of priority or importance of the particular characteristic 203 to the entity. For instance, in the case of the exemplary cybersecurity module, the core concept of recognition of unauthorized access attempts may be assigned a priority value of 0.8, indicating that said core concept may be of greater importance to the entity when compared to core concepts with lower priority values.

The Q-matrix 200 may further comprise a second axis 202, along which one or more assessment metrics 204 may be numerated. The assessment metrics 204 may be the outcomes or results that are expected to change based on implementation of the cybersecurity module. Continuing the example, if the cybersecurity module is intended to improve recognition of unauthorized access attempts (e.g., unauthorized access attempts by e-mail), the core concept may be evaluated along the various assessment metrics 204 (e.g., how many unauthorized attempts were identified, how many unauthorized attempts were successfully prevented, or the like).

Once the characteristics 203 and assessment metrics 204 have been established along their respective axes 201, 202, the system may populate the Q-matrix 200 with correlation values 205 for the pairings for each of the characteristics 203 with each of the assessment metrics 204. The correlation values 205 may, in some embodiments, be a numerical value (e.g., a value ranging from 0 to 1) which represents the degree of correlation between a particular characteristic 203 (or core concept) and a particular assessment metric 204, though it is within the scope of the disclosure for the correlation values 205 to be other types of computational expressions such as numerical ranges, distribution curves, multidimensional relationships, or the like. For instance, the exemplary Q-matrix 200 indicates that the core concept of recognition of unauthorized access attempts has a correlation value of 0.8 with the number of intrusions successfully prevented, which may indicate a relatively high correlation between the characteristic 203 and the assessment metric 204. In other words, the cybersecurity module being assessed has a relatively high effectiveness along the specified characteristic 203 and corresponding assessment metric 204.

Based on the correlation values 205 along with the priority values for the characteristics 203, the system may implement one or more remediation steps with respect to the cybersecurity module. For instance, if the cybersecurity module is ineffective with respect to a particular characteristic 203 or assessment metric 204 (e.g., the core concept of incident reporting and handling), the cybersecurity module make modifications and/or improvements until the correlation values 205 associated with the characteristic 203 and/or assessment metric 204 increase above a specified threshold (e.g., 0.5).

The system may update the correlation values 205 dynamically over time as the assessment metrics 204 change. For instance, after implementation of the cybersecurity module, the number of unauthorized attempts identified may increase. The system may then infer that implementation of the cybersecurity module is correlated with such increase, and thereafter increment the correlation values associated with the change in assessment metric 204. The calculated correlation values 205 may be stored in a database along with associated metadata (e.g., the cybersecurity module assessed, the date and time at which the Q-matrix was generated, the characteristics and metrics used to make the assessment, and the like). In this way, the system may develop a clear picture as to the effectiveness of a given cybersecurity module along multiple different dimensions at any given time.

FIG. 3 illustrates a process flow 300 for quantification of cybersecurity module efficacy using Q-matrix based correlation analysis, in accordance with one embodiment of the present disclosure. The process begins at block 301, where the system identifies a cybersecurity module for assessment. In this regard, an entity may intend to implement or has already implemented one or more cybersecurity modules to address methods for identifying, preventing, and remedying cybersecurity breaches of the entity's network and/or computing systems. Accordingly, it may be desirable for an entity to gain a detailed, granular understanding of the various dimensions of a particular cybersecurity module and its correlation to various metrics for cybersecurity. In an exemplary embodiment, the cybersecurity module may be a training module designed to improve recognition of suspicious Internet applications that may affect the entity's network and/or computing systems.

The process continues to block 302, where the system generates a Q-matrix for assessing the cybersecurity module, the Q-matrix comprising one or more characteristics of the cybersecurity module along a first axis and one or more assessment metrics along a second axis. Continuing the above example, the training module may comprise one or more characteristics (e.g., core concept areas intended to be addressed by the training module). For instance, such core concepts may include recognition of suspicious application behavior, recognition of suspicious filenames or file extensions, identification of potentially unsafe web environments (e.g., web pages using outdated or no encryption methods), or the like. The various core concepts may be compared against the one or more assessment metrics, which may include quantified information regarding outcomes that are expected to be affected by the implementation of the cybersecurity module. For instance, the assessment metrics may include the number of instances in which a suspicious application was reported, the number of instances of network or system breach through web-based malware, the number of times a suspicious application was opened or downloaded by a user computing system, or the like.

The process continues to block 303, where the system populates the Q-matrix by computing correlation values between each of the one or more characteristics and each of the one or more assessment metrics. The correlation value, which in some embodiments may be a numerical value (e.g., a value between 0 and 1), may represent the degree of effectiveness of the cybersecurity module on a certain assessment metric with respect to a particular characteristic or core concept. In some embodiments, the system may compute the correlation values on a dynamic or real-time basis. For instance, the system may detect that one or more assessment metrics have changed over a period of time (e.g., hours, minutes, seconds, or the like). Based on detecting the change in the one or more assessment metrics, the system may automatically update the correlation values based on the change in the one or more assessment metrics.

The process continues to block 304, where the system, based on the correlation values, identifies a set of characteristics from the one or more characteristics for prioritization. In particular, low correlation values may indicate a low effectiveness of the cybersecurity module in affecting particular metrics with respect to certain core concepts. Accordingly, in some embodiments, the set of characteristics may be identified by identifying correlation values that fall below a system-defined threshold. In some scenarios, the system may further take into account priority values associated with each of the characteristics of the cybersecurity module, where higher priority values may indicate a higher importance of particular characteristics. Accordingly, in some embodiments, identifying the set of characteristics for prioritization may comprise ranking and/or ordering each of the set of characteristics for prioritization according to their associated priority values. In this way, the system may prioritize certain aspects of a cybersecurity module's performance.

The process concludes at block 305, where the system implements one or more remediation steps on the set of characteristics for prioritization. The one or more remediation steps include improvements to the cybersecurity module with respect to the set of characteristics identified and selected for prioritization. For instance, the system may determine that the cybersecurity module requires improvement in the areas with respect to detection of unsecured web environments. Accordingly, the entity may implement one or more changes to the cybersecurity module (e.g., addition of material, restructuring of elements, shifts in training paradigms, or the like) to address the deficiencies therein. By using the system described herein, the system provides a data driven process for identifying aspects of cybersecurity modules for prioritization, thereby allowing an entity to efficiently and effectively improve its cybersecurity posture over time.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for quantification of cybersecurity module efficacy using Q-matrix based correlation analysis, the system comprising:
   a memory device with computer-readable program code stored thereon;
   a communication device; and
   a processing device operatively coupled to the memory device and the communication device, wherein the processing device is configured to execute the computer-readable program code to:
      identify a cybersecurity module for assessment;
      generate a Q-matrix for assessing the cybersecurity module, the Q-matrix comprising one or more characteristics of the cybersecurity module along a first axis and one or more assessment metrics along a second axis;
      populate the Q-matrix by computing correlation values between each of the one or more characteristics and each of the one or more assessment metrics, wherein the correlation values indicate a degree of effectiveness of each of the one or more characteristics on each of the one or more assessment metrics, wherein the one or more assessment metrics comprise a number of intrusions successfully detected and a number of intrusions successfully prevented;
      based on the correlation values, identify a set of characteristics from the one or more characteristics for prioritization; and
      implement one or more remediation steps on the set of characteristics for prioritization.

2. The system according to claim 1, wherein the correlation values are computed through a dynamic computation process comprising:
   detecting a change in the one or more assessment metrics; and
   automatically updating the correlation values based on the change in the one or more assessment metrics.

3. The system according to claim 1, wherein identifying the set of characteristics for prioritization comprises:
   detecting, from the correlation values, a set of correlation values that fall below a system-defined threshold; and
   selecting the set of characteristics based on detecting the set of correlation values that fall below the system-defined threshold.

4. The system according to claim 3, wherein each of the characteristics comprises a priority value, wherein identifying the set of characteristics for prioritization further comprises ordering each of the set of characteristics according to the priority value.

5. The system according to claim 1, wherein the correlation values are numerical values.

6. The system according to claim 1, wherein the correlation values are ranges of numerical values.

7. The system according to claim 1, wherein the correlation values are represented as distribution curves.

8. A computer program product for quantification of cybersecurity module efficacy using Q-matrix based correlation analysis, the computer program product comprising at least one non-transitory computer readable medium having computer-readable program code portions embodied therein, the computer-readable program code portions comprising executable code portions for:
   identifying a cybersecurity module for assessment;
   generating a Q-matrix for assessing the cybersecurity module, the Q-matrix comprising one or more characteristics of the cybersecurity module along a first axis and one or more assessment metrics along a second axis;
   populating the Q-matrix by computing correlation values between each of the one or more characteristics and each of the one or more assessment metrics, wherein the correlation values indicate a degree of effectiveness of each of the one or more characteristics on each of the one or more assessment metrics, wherein the one or more assessment metrics comprise a number of intrusions successfully detected and a number of intrusions successfully prevented;
   based on the correlation values, identifying a set of characteristics from the one or more characteristics for prioritization; and
   implementing one or more remediation steps on the set of characteristics for prioritization.

9. The computer program product according to claim 8, wherein the correlation values are computed through a dynamic computation process comprising:
   detecting a change in the one or more assessment metrics; and
   automatically updating the correlation values based on the change in the one or more assessment metrics.

10. The computer program product according to claim 8, wherein identifying the set of characteristics for prioritization comprises:
    detecting, from the correlation values, a set of correlation values that fall below a system-defined threshold; and
    selecting the set of characteristics based on detecting the set of correlation values that fall below the system-defined threshold.

11. The computer program product according to claim 10, wherein each of the characteristics comprises a priority value, wherein identifying the set of characteristics for prioritization further comprises ordering each of the set of characteristics according to the priority value.

12. The computer program product according to claim 8, wherein the correlation values are numerical values.

13. The computer program product according to claim 8, wherein the correlation values are ranges of numerical values.

14. A computer-implemented method for quantification of cybersecurity module efficacy using Q-matrix based correlation analysis, wherein the computer-implemented method comprises:
    identifying a cybersecurity module for assessment;
    generating a Q-matrix for assessing the cybersecurity module, the Q-matrix comprising one or more characteristics of the cybersecurity module along a first axis and one or more assessment metrics along a second axis;
    populating the Q-matrix by computing correlation values between each of the one or more characteristics and each of the one or more assessment metrics, wherein the correlation values indicate a degree of effectiveness of each of the one or more characteristics on each of the one or more assessment metrics, wherein the one or more assessment metrics comprise a number of intrusions successfully detected and a number of intrusions successfully prevented;

based on the correlation values, identifying a set of characteristics from the one or more characteristics for prioritization; and implementing one or more remediation steps on the set of characteristics for prioritization.

15. The computer-implemented method according to claim 14, wherein the correlation values are computed through a dynamic computation process comprising:

detecting a change in the one or more assessment metrics; and automatically updating the correlation values based on the change in the one or more assessment metrics.

16. The computer-implemented method according to claim 14, wherein identifying the set of characteristics for prioritization comprises:

detecting, from the correlation values, a set of correlation values that fall below a system-defined threshold; and selecting the set of characteristics based on detecting the set of correlation values that fall below the system-defined threshold.

17. The computer-implemented method according to claim 16, wherein each of the characteristics comprises a priority value, wherein identifying the set of characteristics for prioritization further comprises ordering each of the set of characteristics according to the priority value.

18. The computer-implemented method according to claim 14, wherein the correlation values are numerical values.

19. The computer-implemented method according to claim 14, wherein the correlation values are ranges of numerical values.

20. The computer-implemented method according to claim 14, wherein the correlation values are represented as distribution curves.

* * * * *